June 8, 1948.    H. E. CARNAGUA    2,442,840
TORQUE CONVERTER WITH FRICTION CLUTCH
Filed July 9, 1942                         2 Sheets-Sheet 1
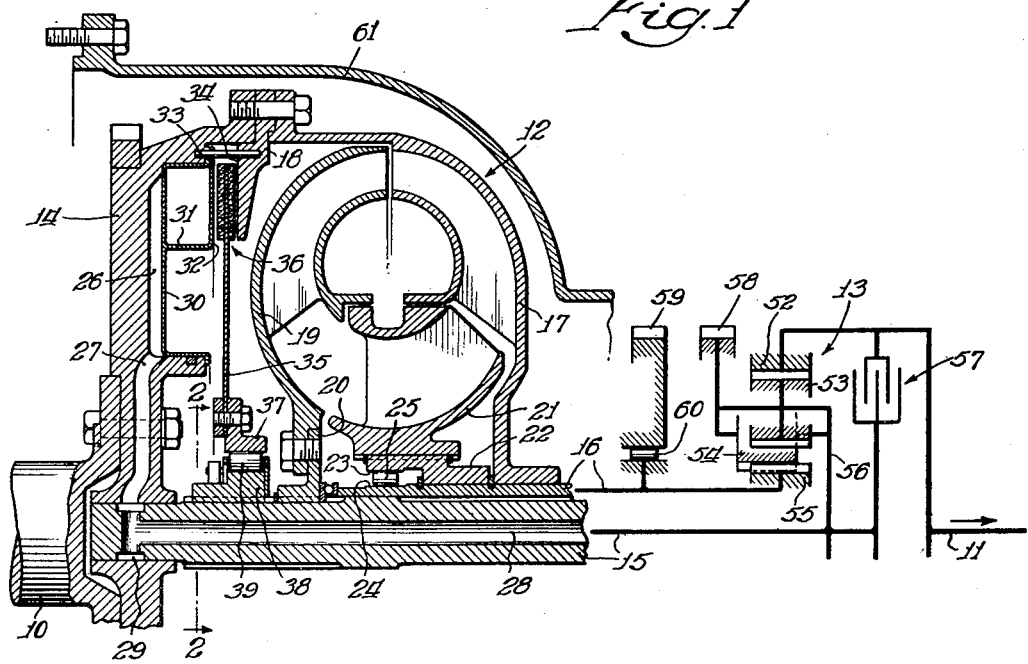
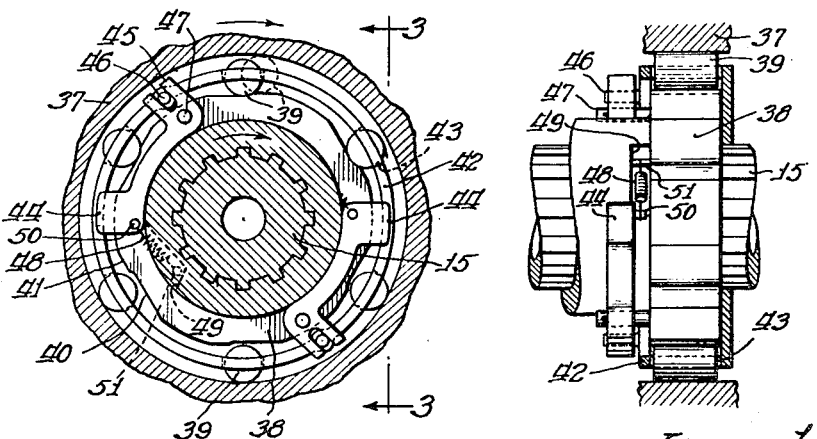
Inventor:
Harold E. Carnagua
By: Edward C. Fitzhugh
Atty.

June 8, 1948.   H. E. CARNAGUA   2,442,840
TORQUE CONVERTER WITH FRICTION CLUTCH
Filed July 9, 1942   2 Sheets-Sheet 2

Inventor:
Harold E. Carnagua
By:
Edward C. Fitzhugh
Atty.

Patented June 8, 1948

2,442,840

UNITED STATES PATENT OFFICE 2,442,840

TORQUE CONVERTER WITH FRICTION CLUTCH

Harold E. Carnagua, Muncie, Ind., assignor to Borg-Warner Corporation, Chicago, Ill., a corporation of Illinois Application July 9, 1942, Serial No. 450,259

20 Claims. (Cl. 192—3.2)

My invention relates to transmissions, and in particular to transmissions of the type comprising a hydrodynamic power transmitting device connected between input and output shafts and a clutch for also connecting the shafts.

In transmissions of the type referred to, the hydrodynamic device drives the output shaft at a lower speed than the input shaft when the clutch is disengaged. The clutch when engaged serves to drive the output shaft substantially in unison with the input shaft. The clutch is ordinarily of the friction type whereby the output shaft may be gradually coupled with the input shaft to raise the speed of the output shaft from that at which it is driven by the hydrodynamic device to the speed of the input shaft. The clutch is commonly disposed in the container for the fluid of the hydrodynamic device.

It has been found with such constructions including a clutch of the friction type that when the clutch is disengaged and the drive is through the hydrodynamic device, the friction clutch produces a substantial loss in power and torque. This is ascribed to the fact that even though the friction clutch is not engaged, the opposite friction surfaces of the clutch do from time to time make contact with each other. The loss in power and torque has been found particularly great with constructions in which the friction clutch is disposed in the container for the fluid of the hydrodynamic device, since each of the opposite friction faces of the clutch tends to move the fluid between the faces at the same speed as the particular face, and the opposite faces are moving at different speeds when the clutch is disengaged and the drive is through the hydro-dynamic device.

It is an object of my invention to provide an improved transmission comprising input and output shafts, means for transmitting torque from the input shaft to the output shaft at a speed which is different from the speed of the input shaft, means for providing a direct connection between the shafts which when ineffective to provide such direct connection creates a power loss by virtue of the speed difference between the shafts, and means for substantially reducing this power loss. It is contemplated that the means for transmitting torque to the output shaft at a speed different from the speed of the input shaft may be a hydro-dynamic power transmitting device and that the means for providing a direct connection between the shafts may be a friction clutch.

More particularly it is an object of my invention to provide connecting means between one of the shafts and the friction clutch which may be broken when the clutch is disengaged to reduce the power loss.

It is also an object of my invention to provide such connecting means between the clutch and one of the shafts which is made and broken by means responsive to the speed of one of the shafts.

It is another object of my invention to provide such connecting means between the clutch and one of the shafts which is made and broken by fluid pressure responsive means.

The invention consists of the novel constructions, arrangements and devices to be hereinafter described and claimed for carrying out the above stated objects and such other objects as will appear from the following description of certain preferred embodiments illustrated in the accompanying drawings, wherein:

Fig. 1 is an illustration, partly in section and partly as a diagram, of a transmission embodying the principles of my invention;

Fig. 2 is a sectional view on an enlarged scale taken on line 2—2 of Fig. 1;

Fig. 3 is a sectional view taken on line 3—3 of Fig. 2;

Like characters of reference designate like parts in the several views.

Figure 4:
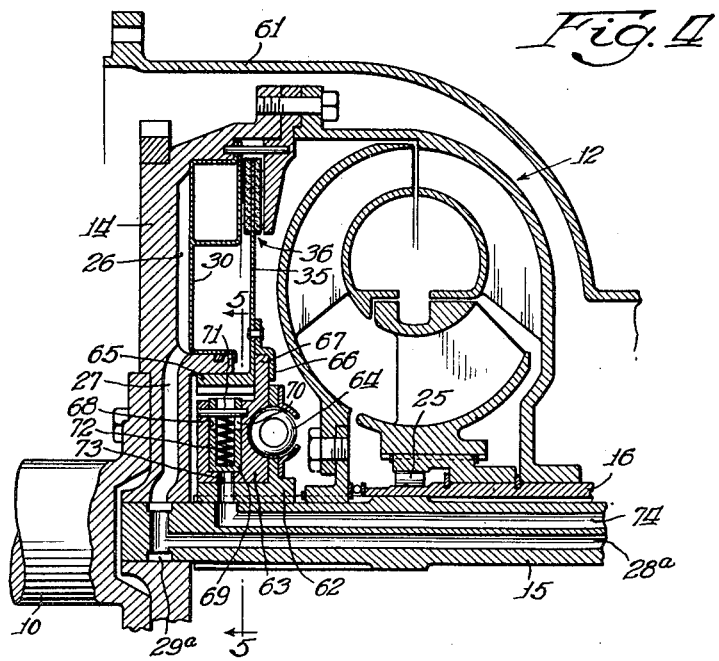
Fig. 4 is a sectional view of a portion of another transmission embodying the principles of my invention.
Figure 5:
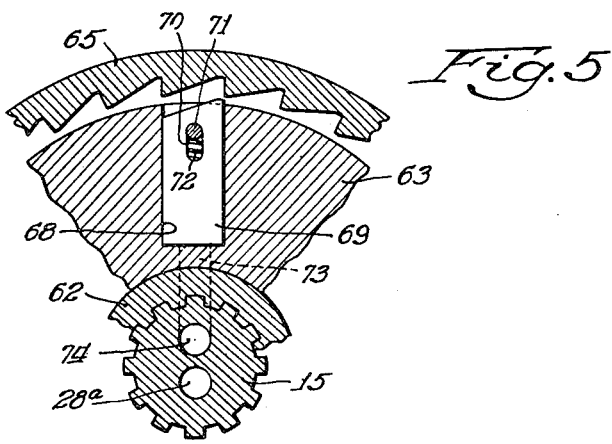
Fig. 5 is a sectional view on an enlarged scale taken on line 5—5 of Fig. 4.

Referring now to Figs. 1 to 3 of the drawings, the illustrated transmission comprises a driving shaft 10, a driven shaft 11, a torque converter unit 12 driven from the shaft 10, and gearing 13 which transmits the drive from torque converter until 12 to driven shaft 11.

The torque converter unit 12 comprises an engine flywheel 14 bolted to the drive shaft 10, a central shaft 15 rotatably disposed in the flywheel 14 and a shaft 16 concentrically disposed on the shaft 15. A vaned pump or driving element 17 is bolted to the flywheel 14 through a member 18 and is rotatably disposed on the shaft 16. A vaned turbine or driven element 19 is bolted to a hub member 20 which is splined on the shaft 15. A vaned stator 21 is splined to a hub member 22 which is rotatably disposed on the shaft 16. Opposite bearing faces 23 and 24 are provided on the members 22 and 16, and rollers 25 are provided between the bearing faces. The bearing faces 23 and 24 are cammed such that the rollers 25 form with these faces a one-way roller brake which allows the stator 21 to rotate in a forward direction but prevents its rotation in a reverse direction.

The flywheel 14 is provided with an annular cavity 26 and with a plurality of fluid passages 27 (one being shown in the drawing) which are in communication with the cavity. The shaft 15 is provided with a fluid passage 28 which has an outlet 29 in communication with the fluid passages 27; and the passage 28 is thus in communication with the cavity 26.

An annular sheet metal or other light weight piston 30 which is provided with a portion 31 fastened thereto and forming a friction face 32, is slidably disposed in the cavity 26. The side edges of the piston 30 and portion 31 are perforated and pins 33 disposed in suitable cavities in the flywheel 14 and member 18 extend through these perforations. The pins 33 serve to prevent the piston 30 and associated portion 31 from turning relative to the flywheel 14. The member 18 is formed to provide a friction face 34 opposite the face 32. It will be noted that the flywheel 14, the piston 30, the member 18 and the casing portion of the pump element 17 serve to form a container, and this container holds the driving fluid of the converter. The illustrated converter is of a well known type, and its pump element serves to drive the turbine element at a lower speed but with greater torque, as is commonly known to those skilled in the art.

A clutch plate 35 having friction facings on its outer edge is disposed with its friction facings between the faces 32 and 34. The faces 32 and 34 and clutch plate 35 together form a friction clutch 36 which is engaged by forcing fluid under pressure into the cavity 26 through the passages 28 and 27 to move the piston and thereby the friction face 32 toward the friction face 34 to grip the clutch plate between the two friction faces. The clutch plate 35 is bolted to a hub member 37 which is adapted to be supported by a hub member 38 through rollers 39. The hub member 38 is provided on its outer periphery with a plurality of of indents 40 and cam portions 41, there being one indent 40 and one cam portion 41 for each roller 39. The hub member 38 is splined to the shaft 15 to rotate therewith.

A roller guide 42 having openings 43 therein is provided between the hub members 37 and 38 with the rollers being disposed in the openings 43. Weight members 44, provided with bifurcated link portions 45 which fit about pins 46 fixed to the roller carrier 42 are pivoted by means of pins 47 on the hub member 38. Each weight member 44 is yieldably held with its inner face on the hub member 38 by a spring 48 disposed in a recess 49 in the hub member 38 and fastened to the weight member by means of a pin 50 and to the hub member by means of a pin 51. The construction is such that movement of the weight members 44 outwardly against the action of the spring 48 causes movement of the roller carrier 42 and the rollers 39 to bring the rollers into contact with the cammed portions 41 and the inner surface of the hub member 37 opposite thereto.

The gearing 13 comprises a ring gear 52, planet gears 53 and 54, and a sun gear 55. The sun gear 55 is mounted on the shaft 16, the carrier 56 for the planet gears is mounted on the shaft 15, and the ring gear 52 is connected with the driven shaft 11 of the transmission. A friction clutch 57 actuated by any suitable means is provided for connecting the shafts 15 and 11. A brake device 58 is provided on the carrier 56, and a brake device 59 is provided for the shaft 16. A one way roller and cam type brake 60 is provided between the brake 59 and the shaft 16 which allows the shaft 16 to rotate in a forward direction but not in a reverse direction when the brake 59 is arrested. The converter unit 12 and the gearing unit 13 may be enclosed in any suitable housing 61.

The transmission is operated initially, at low speed ratio, with brake 59 arrested, brake 58 free, and clutches 57 and 36 disengaged. Under these conditions power will be transmitted from drive shaft 10 through flywheel 14, pump element 17, turbine element 19, shaft 15, planet carrier 56, planet gears 53 and 54, and ring gear 52 to the driven shaft 11. With brake 59 arrested, the one way brake 60 operates to hold the sun gear 55 against reverse rotation, and the sun gear constitutes a reaction member. At this low speed ratio of the transmission, the shaft 11 is rotated at a speed less than that of the shaft 15 due to the speed reduction of the planetary gearing including the gears 52, 53, 54 and 55; and the shaft 15 rotates at a speed less than that of the shaft 10 due to the difference of speed of the pump 17 and turbine 19 when the drive is through the converter.

When the shaft 15 is rotated only at a slow speed, the weight members 44, which rotate with the shaft 15, are held by the springs 48 against the hub member 38, and the rollers 39 are held by the roller carrier 42 in the indents 40 and out of contact with the cam portions 41. There is thus no rigid connection between the clutch plate 35 and the hub member 38, and the clutch plate 35 is free to rotate as it will between the friction faces 32 and 34. The power lost by the clutch 36 and which would be particularly great if the opposite engaging clutch faces were rigidly connected with the shafts 10 and 15 is thus reduced and made insubstantial in value.

As the speed of the shaft 15 increases, the weight members 44 move outwardly about the pins 47; and, at a predetermined speed of the shaft, by means of the links 45 and carrier 42, the rollers 39 are moved into bearing relation with the cam portions 41 and the surfaces of the hub member 37 opposite thereto. The rollers 39 thus make a connection between the clutch plate 35 and the hub member 38, and this connection is conditioned such that power may be transmitted therethrough in the forward direction of rotation. Fluid under pressure is thereafter admitted into the cavity 26 through the passages 27 and 28 to move the piston 30 rearwardly and to move the friction faces 32 and 34 together to grip the clutch plate therebetween. On such engagement of the clutch 36, power is transmitted through the clutch and the rollers 39, and the pump and turbine elements 17 and 19 are connected to rotate substantially in unison. When the clutch 36 is so engaged, the shafts 15 and 11 rotate at higher speeds than before, and the transmission is in intermediate speed ratio.

In order to drive the shaft 11 at high speed ratio, the clutch 57 is engaged. The shafts 15 and 11 are thus locked up to rotate in unison.

For reverse drive, carrier 56 is held against rotation by means of brake 58, and brake 59 and clutches 36 and 57 are released. Brake 58 serves to hold the shaft 15 and turbine element 19 against rotation whereby the function of the turbine element is reversed with respect to stator 21 so that the latter becomes the driven element and drives sun gear 55 in a reverse direction. Because of the double planetary arrangement, ring gear 52 will likewise be rotated in a reverse direction thereby effecting reverse drive through the transmission.

The Fig. 4 embodiment of my invention is similar to the above described embodiment except that I provide fluid pressure responsive means for making a connection between the clutch plate 35 and the shaft 15 instead of speed responsive means. A hub member 62 is splined on the shaft 15, and another hub member 63 is rotatably disposed on the member 62. A spring 64 is provided for connecting the members 62 and 63, and the construction is such that when the member 63 is driven in a forward direction it will drive the member 62 in such direction through the spring 64. The clutch plate 35 is constructed with an internally toothed rim 65, and the clutch plate 35 has fastened thereto a plurality of brackets 66 (one being shown in the drawing) which fit over an outwardly extending rib 67 of the member 63. The brackets 66 and the clutch plate 35 have a running fit with the rib 67 such that the plate 35 may freely rotate with respect to the member 63 if no other connection is provided between the plate 35 and member 63.

A cylinder 68 is provided in the member 63, and a plunger 69 which is beveled on its outer end to mesh with the teeth on the rim 65 is slidably disposed in the cylinder. The plunger 69 is provided with slots 70 in its sides, and a pin 71 fixed in the member 63 extends through these slots. A spring 72 is provided in the plunger and bears at one end on the pin 71 and at the other end on the bottom of the plunger. The spring thus serves to hold the plunger yieldingly at the innermost limit of its movement. A fluid passage 73 is provided through the members 62 and 63 and is in communication with a passage 74 in the shaft 15. A fluid passage 28a having an outlet 29a and similar to the pasage 28 in the Fig. 1 embodiment of my invention but being at a different location in the shaft 15 is provided for supplying fluid under pressure to the passages 27.

The Fig. 4 embodiment of my invention operates in substantially the same manner as the Fig. 1 embodiment except that when it is desired to condition the connection between the clutch plate 35 and the shaft 15 for a drive therethrough, fluid under pressure is supplied to the passages 74 and 73, and the plunger 69 is thereby moved outwardly against the action of the spring 72 into contact with the teeth on the inner side of the rim 65.

In my improved transmission construction, I provide means for transmitting torque from an input shaft to an output shaft at a speed different from the speed of the input shaft which means in the illustrated embodiments is a torque converter, means for providing a direct connection between the shafts which when ineffective to provide such direct connection creates a power loss by virtue of the speed difference between the input and output shafts, the last mentioned means in the illustrated embodiments being a friction clutch, and I provide means for advantageously substantially reducing the power loss which means in the illustrated embodiments is a releasable connection between the clutch and one of the shafts.

I wish it to be understood that my invention is not to be limited to the specific constructions shown and described, except so far as the claims may be so limited, as it will be apparent to those skilled in the art that changes may be made without departing from the principles of my invention.

I claim:

1. In a transmission, the combination of an input shaft, an output shaft, a hydrodynamic power transmitting device connecting said shafts, and comprising a container for the fluid of the device and driving and driven coupling elements in the container, a friction clutch for connecting said shafts and disposed in said container and subject to substantially the same fluid pressures as said coupling elements, and a releasable connection between one of said shafts and said clutch and having an operative condition in which it may complete a power train from said input to said output shaft through said clutch and having an inoperative condition in which it breaks said power train, said releasable connection in its inoperative condition allowing the engaging parts of the clutch to rotate at substantially the same speed when the clutch is disengaged and the drive is through the hydrodynamic device.

2. In a transmission, the combination of an input shaft, an output shaft, a hydrodynamic coupling device for transmitting torque from the input shaft to the output shaft at a lower speed than the speed of the input shaft and including a container for the fluid of the coupling and driving and driven coupling elements in the container, a clutch adapted for directly connecting said shafts, said clutch being disposed in said container and being subject to substantially the same fluid pressure as said coupling elements, and means for reducing frictional drag of the clutch when the clutch is disengaged and the hydrodynamic coupling device is operative.

3. In a transmission, the combination of an input shaft, an output shaft, means for transmitting torque from the input shaft to the output shaft at a speed which is different from the speed of the input shaft, a friction clutch comprising a friction member connected with each shaft and adapted for directly connecting said shafts, and releasable connecting means between one of said friction members and its shaft and having an operative condition in which it may complete a power train from said input to said output shaft through said clutch and having an inoperative condition in which it breaks said power train, said releasable connecting means in its inoperative condition freeing said last-named friction member from its shaft when the clutch is disengaged whereby the friction members of the clutch may rotate at substantially the same speed.

4. In a transmission, the combination of an input shaft, an output shaft, a hydrodynamic device for transmitting torque from the input shaft to the output shaft at a speed which is different from the speed of the input shaft, a clutch for directly connecting said shafts and comprising a pair of opposed friction members adapted to be brought into driving contact, and releasable connecting means between one of said friction members and its shaft and having an operative condition in which it may complete a power train from said input to said output shaft through said clutch and having an inoperative condition in which it breaks said power train, said releasable connecting means in its inoperative condition freeing said last named friction member from its shaft when the clutch is disengaged whereby said opposed friction members may rotate at substantially the same speed.

5. In a transmission, the combination of an input shaft, an output shaft, a hydrodynamic device for transmitting torque from the input shaft to the output shaft at a lower speed than the speed of the input shaft and including a container for the fluid of the device and driving and driven coupling elements in the container, a friction clutch comprising a friction member connected with each shaft and adapted for directly connecting said shafts, said clutch being disposed in said container and its members being subject to substantially the same fluid pressure as said coupling elements, and releasable connecting means between one of said friction members and its shaft and having an operative condition in which it may complete a power train from said input to said output shaft through said clutch and having an inoperative condition in which it breaks said power train, said releasable connecting means in its inoperative condition freeing said last named friction member from its shaft when the clutch is disengaged whereby the clutch engaging members may rotate at substantially the same speed.

6. In a transmission, the combination of an input shaft, an output shaft, means for transmitting torque from the input shaft to the output shaft at a speed which is different from the speed of the input shaft, a friction clutch comprising a friction member connected with each shaft and adapted for directly connecting said shafts, releasable connecting means between one of said friction members and its shaft for freeing said member from its shaft when the clutch is disengaged, and means responsive to the speed of one of the shafts for conditioning said releasable connecting means for a drive therethrough.

7. In a transmission, the combination of an input shaft, an output shaft, a hydrodynamic device for transmitting torque from the input shaft to the output shaft at a lower speed than the speed of the input shaft and including a container for the fluid of the device, a friction clutch comprising a friction member connected with each shaft and adapted for directly connecting said shafts, said clutch being disposed in said container, a roller clutch between said friction clutch and one of said shafts for freeing the respective friction member from said shaft when the friction clutch is disengaged, and centrifugal means actuated by said output shaft for moving the rollers of said roller clutch into bearing contact with opposed surfaces of the roller clutch to condition the roller clutch for a drive therethrough.

8. In a transmission, the combination of an input shaft, an output shaft, a hydrodynamic device for transmitting torque from the input shaft to the output shaft at a lower speed than the speed of the input shaft, a friction clutch comprising a friction member connected with each of said shafts and adapted for directly connecting said shafts, a roller clutch between one of said friction members and its shaft for freeing the member from its shaft when the friction clutch is disengaged, and a weight carried with said output shaft and linked with the rollers of said roller clutch to move the rollers into bearing contact with opposed surfaces of the roller clutch to condition the roller clutch for a drive therethrough.

9. In a transmission, the combination of an input shaft, an output shaft, a hydrodynamic device for transmitting torque from the input shaft to the output shaft at a lower speed than the speed of the input shaft, and including a container for the fluid of said device, a friction clutch for directly connecting said shafts and disposed in said container, said clutch comprising a clutch plate connected by a roller clutch with said output shaft and a pair of opposed friction faces carried by the input shaft and adapted to be moved toward each other to grip the clutch plate, said roller clutch being adapted to free the clutch plate from the output shaft when the friction clutch is disengaged, and a weight carried with said output shaft and linked with the rollers of said roller clutch to move the roller into bearing contact with opposed surfaces of the roller clutch to condition said roller clutch for a drive therethrough.

10. In a transmission, the combination of an input shaft, an output shaft, means for transmitting torque from the input shaft to the output shaft at a speed which is different from the speed of the input shaft, a friction clutch comprising a friction member connected with each shaft and adapted for directly connecting said shafts, and a releasable connecting means between one of said friction members and its shaft for freeing said member from its shaft when the clutch is disengaged, means for engaging said connecting means, means for releasing said connecting means, one of said two last named means comprising fluid under pressure.

11. In a transmission, the combination of an input shaft, an output shaft, a hydrodynamic device for transmitting torque from the input shaft to the output shaft at a speed which is different from the speed of the input shaft and including a container for the fluid of said device, a friction clutch comprising a friction member connected with one of said shafts and a second member releasably connected to the other of said shafts and adapted for directly connecting said shafts, said friction clutch being disposed in said container, said releasable connecting means between one of said friction members and its shaft freeing said member from its shaft when the clutch is disengaged, said last named means including a plunger means for actuating said plunger to engage said connecting means, means for actuating said plunger to release said connecting means, one of said two last-named means comprising fluid under pressure.

12. In a transmission, the combination of an input shaft, an output shaft, means for transmitting torque from the input shaft to the output shaft at a speed which is different from the speed of the input shaft, a friction clutch for directly connecting said shafts, said clutch comprising a clutch plate for driving the output shaft and a pair of opposed friction faces carried by the input shaft and adapted to be moved toward each other to grip the clutch plate, and releasable connecting means between said clutch plate and said output shaft for freeing the clutch plate from said shaft when the clutch is disengaged, said last named means including a hub member carried with said output shaft and supporting said clutch plate, and a plunger in said hub member under the control of fluid under pressure for releasably holding said clutch plate and hub member against relative movement.

13. In a transmission, the combination of an input shaft, an output shaft, a hydrodynamic device for transmitting torque from the input shaft to the output shaft at a lower speed than the speed of the input shaft and comprising a container for the fluid of the device, a friction clutch for directly connecting said shafts and disposed in said container, said clutch comprising a clutch plate for driving the output shaft and a pair of opposed friction faces carried by the input shaft and adapted to be moved toward each other to grip the clutch plate, and releasable connecting means between said clutch plate and said output shaft for freeing said clutch plate from the output shaft when the clutch is disengaged, said last named means including a hub member on said output shaft and supporting said clutch plate, a spring, said hub member being adapted to drive the output shaft through said spring, a toothed rim carried by said clutch plate, and a plunger in said hub member under the control of fluid under pressure and adapted to interengage with teeth of said rim for releasably holding said clutch plate and hub member against relative movement.

14. In a transmission, the combination of an input shaft, an output shaft, speed changing means connecting said shafts, a clutch for connecting said shafts, and a releasable connection between said clutch and one of said shafts and having an operative condition in which it may complete a power train from said input to said output shaft through said clutch and having an inoperative condition in which it breaks said power train, said releasable connection in its inoperative condition allowing the engaging parts of the clutch to rotate at substantially the same speed when the speed changing means is operative and the clutch is disengaged.

15. In a transmission, the combination of an input shaft, an output shaft, speed changing means connecting said shafts to cause said shafts to rotate at different speeds, a friction clutch for directly connecting said shafts and comprising a driving friction member connected with one of said shafts and a driven friction member connected with the other of said shafts and adapted to engage with the driving friction member, and means for allowing said friction members to rotate at substantially the same speed for reducing frictional drag of the clutch when the clutch is disengaged and said speed changing means is operative as aforesaid to drive the output shaft at a different speed from the input shaft.

16. In a transmission, the combination of an input shaft, an output shaft, a hydro-dynamic coupling device for transmitting torque from the input shaft to the output shaft at a lower speed than the speed of the input shaft and including a container, fluid in the container and driving and driven coupling elements in the container connected respectively with said input and output shafts, a friction clutch adapted for directly connecting said shafts and being disposed in said container, said clutch comprising a driving friction member connected with one of said shafts and a driven friction member connected with the other of said shafts and adapted to engage with the driving friction member, and means for allowing said friction members to rotate at substantially the same speed for reducing frictional drag of the clutch when the clutch is disengaged and the hydro-dynamic coupling device is operative as aforesaid to drive the output shaft at a lower speed than the input shaft.

17. In a transmission, the combination of an input shaft, an output shaft, a hydrodynamic power transmitting device connecting said shafts for a drive from said input to said output shaft, a friction clutch for connecting said shafts for a drive from said input to said output shaft in parallel with the drive through said hydrodynamic device, and a releasable connection between one of said shafts and said clutch and having an operative condition in which it may complete a drive from said input to said output shaft through said clutch and having an inoperative condition in which it breaks any drive through said clutch from said input to said output shaft and allows the engaging parts of the clutch to rotate at substantially the same speed when the clutch is disengaged and the drive is through the hydrodynamic device from said input to said output shaft.

18. In a transmission, the combination of an input shaft, an output shaft, speed changing means connecting said shafts to cause said shafts to rotate at different speeds when there is a drive from said input to said output shaft, a friction clutch comprising a friction member connected with each shaft and adapted for directly connecting said shafts for a drive from said input to said output shaft in parallel with said speed changing means, and releasable connecting means between one of said friction members and its shaft and having an operative condition in which it may complete a drive from said input to said output shaft through said clutch and having an inoperative condition in which it breaks any drive through said clutch from said input to said output shaft and frees said last-named friction member from its shaft allowing the friction members of the clutch to rotate at substantially the same speed.

19. In a transmission, the combination of an input shaft, an output shaft, speed changing means connecting said shafts to cause said shafts to rotate at different speeds when there is a drive from said input to said output shaft, a friction clutch having a pair of engaging parts and adapted for directly connecting said shafts for a drive from said input to said output shaft in parallel with said speed changing means, and means for allowing the said engaging clutch parts to rotate at the same speed for reducing frictional drag of the clutch when the clutch is disengaged and the speed changing means is operative to drive said output shaft from said input shaft.

20. In a transmission, the combination of an input shaft, an output shaft, a hydrodynamic power transmitting device connecting said shafts, a friction clutch comprising a pair of engaging parts and arranged for connecting said shafts, and a releasable connection between one of said shafts and one of said clutch parts and, when released, freeing said part from said shaft for rotation in either direction of rotation for allowing the engaging parts of the clutch to rotate at substantially the same speed when the clutch is disengaged and the drive is through the hydrodynamic device.

HAROLD E. CARNAGUA.

REFERENCES CITED

The following references are of record in the file of this patent:

UNITED STATES PATENTS

| Number | Name | Date |
|---|---|---|
| 1,959,349 | Dodge | May 22, 1934 |
| 2,045,615 | Rosle et al. | June 30, 1936 |
| 2,120,896 | Koeppen et al. | June 14, 1938 |

FOREIGN PATENTS

| Number | Country | Date |
|---|---|---|
| 432,807 | Great Britain | Aug. 2, 1935 |